United States Patent [19]

Brickerd, Jr. et al.

[11] 4,012,641
[45] Mar. 15, 1977

[54] PORTABLE PULSED SIGNAL GENERATOR

[75] Inventors: Millard S. Brickerd, Jr.; John A. Hudson, both of Panama City, Fla.

[73] Assignee: The United States of America as represented by the Secretary of the Navy, Washington, D.C.

[22] Filed: Dec. 5, 1975

[21] Appl. No.: 637,996

[52] U.S. Cl. .......................... 307/106; 102/18 MS; 321/49
[51] Int. Cl.² ........................................ H03K 3/00
[58] Field of Search ........................ 102/18, 18 MS; 323/89 C; 321/49, 48; 307/106

[56] References Cited
UNITED STATES PATENTS

| | | | |
|---|---|---|---|
| 2,222,214 | 11/1940 | Carmichael | 321/49 |
| 3,246,309 | 4/1966 | Gasch, Jr. | 321/49 |
| 3,373,339 | 3/1968 | Birman | 321/49 |
| 3,707,913 | 1/1973 | Lee | 102/18 MS |

Primary Examiner—Samuel Feinberg
Attorney, Agent, or Firm—Richard S. Sciascia; Don D. Doty; Harvey A. David

[57] ABSTRACT

A portable pulsed signal generator which generates a low-frequency, high-powered signal from a constant direct current, low power source is disclosed as including an inverter for driving a plurality of motors which, in turn, actuate control switches by means of cams and cam followers associated therewith. A potentiometer driven by one of said motors, in turn, effectively controls the output of a direct current amplifier, with the varying direct current output signal therefrom having the alternate half-waves thereof polarity reversed by switch controlled relays, the switch of which is timely actuated by one of the aforesaid cams, cam followers, and other switches, respectively, so as to produce a low-frequency, high-power, substantially alternating current signal. After appropriate transduction said low-frequency, high-power, substantially alternating current signal may be employed for sweeping mines.

5 Claims, 3 Drawing Figures

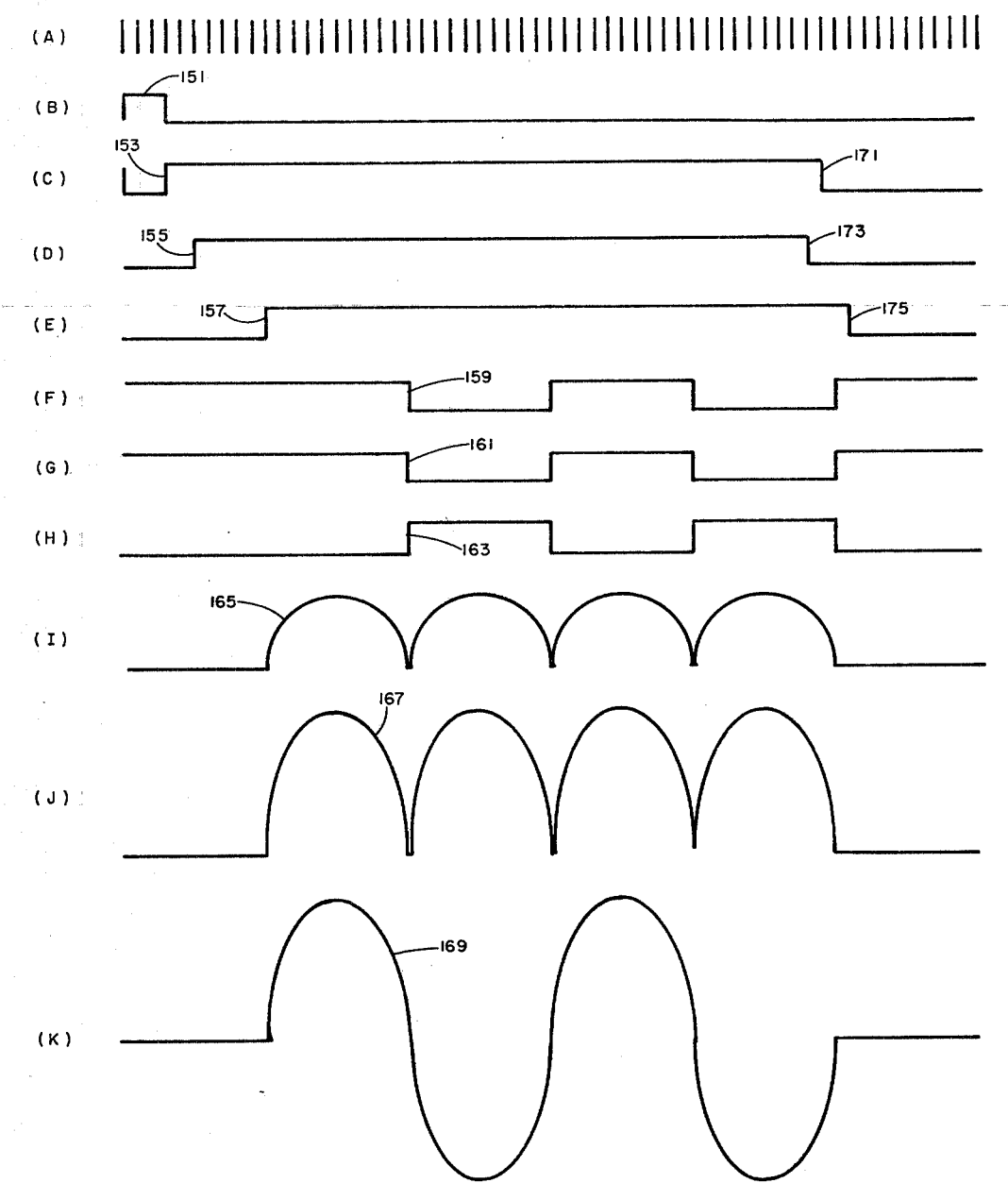
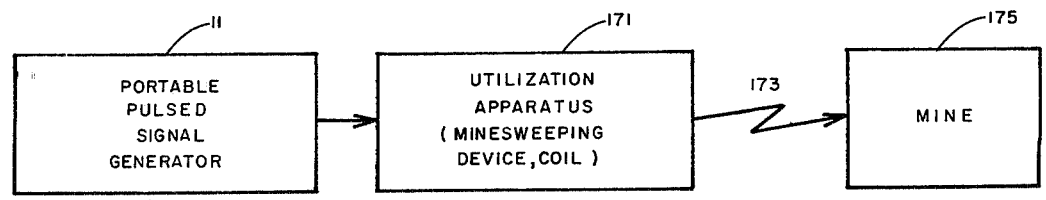
Fig. 2
Fig. 3

PORTABLE PULSED SIGNAL GENERATOR

STATEMENT OF GOVERNMENT INTEREST

The invention described herein may be manufactured and used by or for Government of the United States of America for governmental purposes without the payment of any royalties thereon or therefor.

FIELD OF THE INVENTION

The present invention, in general, relates to signal generators and, in particular, is a portable pulsed sine wave signal generator, the sine wave signal of which is of such frequency and power that it may, for example, be used in conjunction with proper transducing or other apparatus to sweep various and sundry mines, including marine mines.

DESCRIPTION OF THE PRIOR ART

Electrical signal generators are so numerous in quantity and type that it would not be efficacious or appropriate to attempt to describe them here. Suffice to say, that most thereof employ a bipolar power source in order to produce a bipolar current signal; that most thereof are not portable; that most thereof are not readily programmable; and most thereof are not true sine wave signal generators.

The instant invention overcomes some of the disadvantages of the prior art, in that it produces a bipolar, substantially sine wave current signal from a unipolar source, such as storage batteries or the like; it is easily programmed; it is pulsed if and when desired; it is easily and economically transported; and the sine wave current signal generated thereby may have many desired frequencies and powers, including very low frequencies and exceptionally high powers.

It, therefore, is an object of this invention to provide an improved signal generator.

Another object of this invention is to provide a portable low-frequency, high-power signal generator.

Still another object of this invention is to provide an improved method and means for producing a bipolar current signal from a unipolar power source, such as a battery or the like.

A further object of this invention is to provide a programmable, pulsed bipolar current signal generator whose output frequency and power may be varied as desired.

Another object of this invention is to provide an improved method and means of driving minesweeping apparatus.

Another object of this invention is to provide an improved, simplified system for sweeping, neutralizing, and effecting the detonation of various and sundry mines, including marine mines.

Another object of this invention is to provide an improved method and means for electrically driving electrical load apparatus requiring low frequency, high current, and high or low power inputs thereto, in order to effect the proper operation thereof.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 2 is a signal timing diagram, with various and sundry signal operations and events and waveforms corresponding thereto which occur in the invention plotted against time as the abscissa thereof;

FIG. 3 is a block diagram of a minesweeping system within which the device of FIG. 1 may be incorporated to an advantage.

DESCRIPTION OF THE PREFERRED EMBODIMENT

Figure 1:
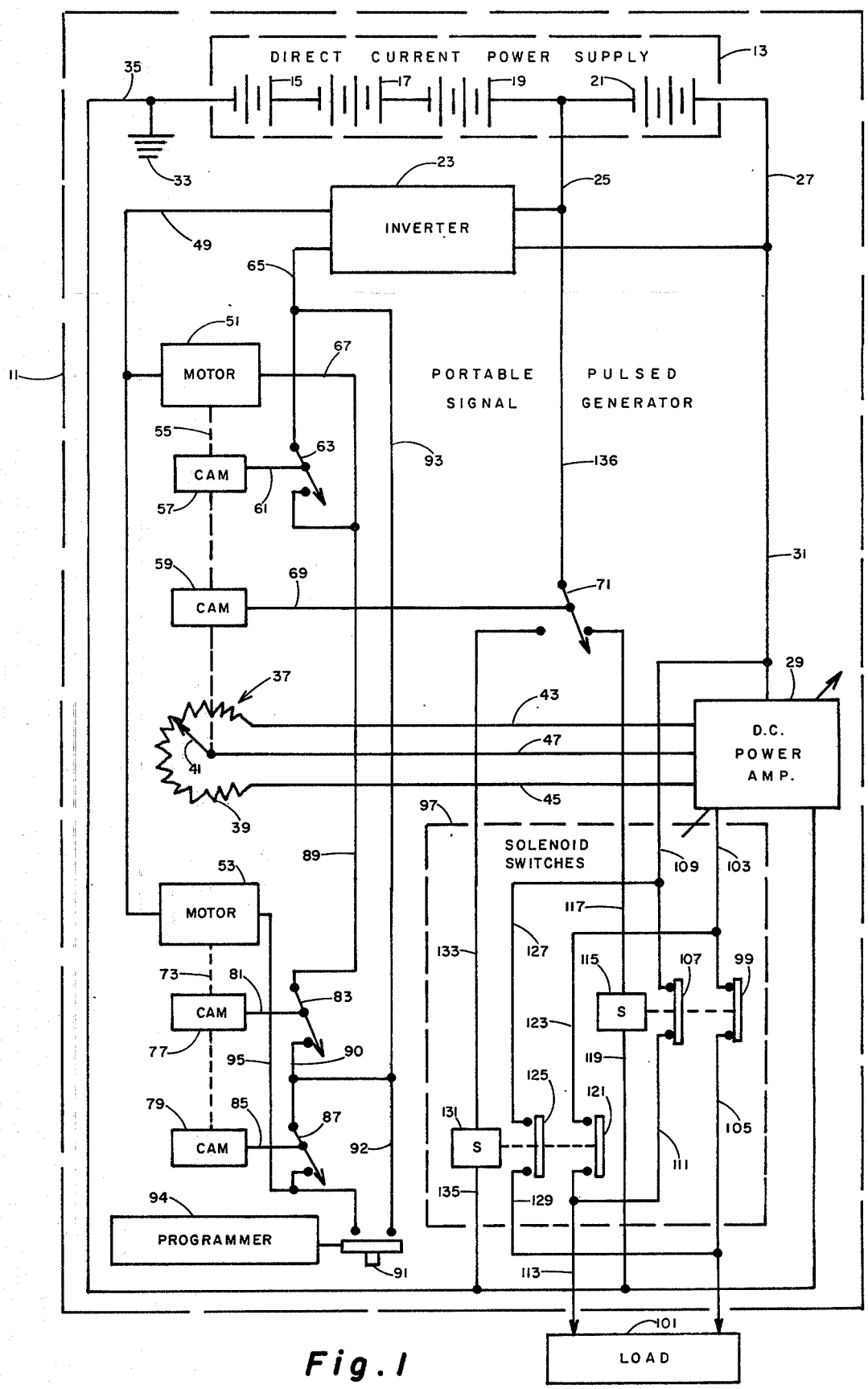
FIG. 1 is a combination block and schematic diagram of the portable pulsed signal generator constituting the subject invention.

Referring now to FIG. 1, there is shown a preferred embodiment of the subject invention 11 as containing a direct current power supply 13 which includes a 6 volt battery 15 and three 12 volt batteries 17, 19, and 21, all of which are connected in series, to provide a total voltage of 42 volts.

An inverter 23 for converting D.C. current to A.C. current is connected across 12 volt battery 21 by electrical leads 25 and 27. Although it should be understood that inverter 23 may be of any conventional and commercially available type that is suitable for its intended purpose, it has been determined that inverter model KN 3T-115-60, manufactured by Abbott Transistor Labs., Inc., of Los Angeles, Calif. is quite appropriate therefor.

The positive terminal of battery 21 of direct current power supply 13 is connected to the positive input terminal of an adjustable D.C. power amplifier 29 by means of electrical leads 27 and 31, with negative input terminal input thereof connected to the negative terminal of the aforesaid battery 15 of direct current power supply 13 and optionally to a ground 33 by means of electrical lead 35.

D.C. power amplifier 29 may also be of any suitable type, but it has been found that D.C. amplifier model 300B, manufactured by Inland Controls Company of Boston, Mass., is eminently satisfactory therefor.

The control voltage which is supplied to the control input of D.C. amplifier is supplied by means of a potentiometer 37, having a predetermined resistance 39 and a rotatable contact 41 arm movable against said resistance 39. The opposed terminals of resistance 39 are connected across any predetermined voltage source, but in this case, one that is located in D.C. power amplifier 29 itself by means of leads 43 and 45. Of course, as may readily be seen, rotatable arm 41 is electrically connected to the aforementioned control input of D.C. power amplifier 29 by means of lead 47. Hence, depending on its position against resistance 37, arm 41 picks off a voltage therefrom at any given instant and supplies it to said control input of D.C. power amplifier 29 which, in turn, controls the amplification thereof at that particular instant. As arm 41 is rotated, the control voltage is varied and the amplification of D.C. power amplifier is varied in proportion thereto.

One of the outputs of inverter 23 is connected by means of electrical lead 49 to motors 51 and 53.

Motor 51 contains a shaft 55 upon which a pair of cams 57 and 59 are mounted for rotation therewith. Also, the outer extremity of shaft 55 is effectively connected to the above mentioned rotatable arm 41 of potentiometer 37 in such manner that arm 41 is rotated thereby.

A cam follower 61 slidably engages cam 57 and is moved thereby in such manner that a switch 63 connected to the other end thereof is timely opened and closed thereby. One of the terminals of switch 63 is connected to the other output of inverter 23 by means of electrical leads 65, and the other terminal of switch 63 is connected to the output of motor 51 by means of electrical lead 67.

Cam 59 also has a cam follower 69 slidably engaged therewith which is connected at the other extremity thereof to the movable arm of a single throw-double pole switch 71, thereby causing said movable arm to be timely in contact with one or the other of the poles of said switch 71.

Motor 53 likewise has a rotatable shaft 73 upon which another pair of cams 74 and 77 is mounted for rotation therewith.

Cam 77 has a cam follower 81 slidably engaged therewith, with the latter connected at the outer extremity thereof to the movable arm of a switch 83 for timely effecting the opening and closing thereof. Cam 79 likewise has a cam follower 85 connected to the movable arm of a switch 87 for timely effecting the opening and closing thereof.

The timing of the opening and closing of switches 63, 83, and 87, and the movement of the movable arm of switch 71 will be discussed more fully in conjunction with FIG. 2 during the discussion of the operation of the invention presented subsequently.

The movable arm of switch 83 is electrically connected to the output of motor 51 by means of electrical leads 89 and 67. The contact terminal of switch 83 is connected to the movable arm of switch 87 by means of electrical lead 90 and to one of the contacts of a push button on-off switch 91 by means of an electrical lead 92, as well as to the other output of inverter 23 by means of leads 90, 93, and 65.

A programmer 94 may be employed to close and open push button switch 91 in accordance with any predetermined program. However, so doing should be considered as being optional, inasmuch as push button switch 91 is ordinarily operated manually. The other terminal of switch 91 is connected to the other terminals of switch 87 and motor 53 by means of electrical lead 95.

A pair of current-reversing, solenoid-actuated relays 97 are effectively, respectively, and alternately connected between direct current power supply 13 and direct current power amplifier 29. More specifically, a first solenoid switch has one of its switches 99 connected between the output of D.C. power amplifier 29 and one of the terminals of a load 101 by means of electrical leads 103 and 105, and the other of the switches 107 is connected between the positive terminal of battery 21 and the other terminal of load 101 by means of electrical leads 31, 109, 111, and 113. Solenoid 115 is mechanically connected to switches 99 and 107 in such manner as to effect the simultaneous closure thereof upon energization and to effect the simultaneous opening thereof upon de-energization; it is electrically connected between one terminal of the aforesaid switch 71 and the grounded negative terminal of battery 15 of direct current power supply 13 by means of electrical leads 117 and 119.

The second solenoid switch of said pair of solenoid relays 97 has one of its switches 121 connected between the output of D.C. power amplifier 29 and a terminal of load 101 by means of electrical leads 123, 103, and 113, and the other thereof 125 is connected between the positive terminal of battery 21 and another terminal of load 101 by means of electrical leads 127, 109, 31, 27, and 129. Solenoid 131 is mechanically connected to switches 121 and 125 in such manner as to effect the simultaneous closure thereof when energized and to effect the simultaneous opening thereof when deenergized. It is electrically connected between the other terminal of switch 71 and the grounded, negative terminal of battery 15 of direct current power supply 13 by means of electrical leads 133, 135, and 35.

The movable arm of said switch 71 is electrically connected to the interconnected terminal of batteries 19 and 21 by means of electrical leads 136 and 25.

At this time, it would perhaps be noteworthy that all of the elements and components included in the subject invention are well known, conventional and commercially available, whether shown in block of schematic form. Therefore, it should be understood that it is their new and unique interconnections and interactions that produce the instant invention and cause the improved results to be effected thereby. Moreover, it would be well within the purview of the artisan having the benefit of the teachings presented herewith to make whatever design choices as would be necessary to make the invention as portrayed in FIG. 1 function in accordance with the timing diagram of FIG. 2, in the system of FIG. 3, or in any compatible system or device.

MODE OF OPERATION

The operation of the invention will now be discussed briefly in conjunction with all of the FIGURES of the drawing.

The invention is turned on and, consequently D.C. to A.C. inverter 23 puts out a 60 cycle per second signal similar to that shown in exagerated form in FIG. 2(A). Of course, it should be recognized that the frequency thereof is too great to be properly illustrated graphically; consequently, FIG. 2(A) should merely be considered as being a representation of the actual signal produced at the output of inverter 23.

The invention is operationally enabled—as far as its aforesaid stated objectives are concerned—by manually or other wise closing push-button switch 91. So doing is represented by the waveform depicted in FIG. 2(B), with positive period 151 representing some particular period of time that pushbutton 91 is held down.

Closure of pushbutton switch 91 turns motor 53 on and, thus, it begins to rotate shaft 73 and cams 77 and 79. Very shortly after being turned on, cams 77 and 79 move their respective cam follows 81 and 85 to such positions that they cause switch 87 to close at, say, time 153 of FIG. 2(C), so as to keep motor 53 running even though pushbutton switch 91 has been opened, due to the release thereof. Also, shortly after switch 87 is closed, cam 77 and cam follower 81 cause switch 83 to close, say, at time 155 of FIG. 2(D), thereby causing motor 51 to start running. Once motor 51 is running, shaft 55 and cams 57 and 59 turn, and at, say, time 157 of FIG. 2(E), cam 57 and cam follower 61 cause switch 63 to be closed, thereby causing motor 51 to continue running even though switch 83 is subsequently opened.

The rotation of cams 59 and the movement of cam follower 69 (as a result of the running of motor 51) causes switch 71 to change state—that is, for example, to rotate the movable arm of switch 71 to close with the left electrical contact thereof, as shown in FIG. 1—at, say, time 159 of FIG. 2(F). Such closure of the movable arm with the left contact of switch 71 is, of course, preceded by the opening thereof with the right contact and, thus, causes solenoid 115 to be denergized at time 161, thereby changing the state of switches 99 and 107 from closed to open. As just suggested, the opening of one contact—be it left or right—precedes the closing with the other; however, in actual practice, the switching is so rapid that the time between the opening of one and closing of the other is, for all practical purposes, negligible. Hence, the closure of the movable arm of switch 71 with the left hand contact causes solenoid 131 to be energized at time 163 of FIG. 2(G), which, in turn, causes switches 121 and 125 to change state from open to closed. From the foregoing, it should now be obvious that whenever switches 99 and 107 are open, switches 121 and 125 are closed, and vice versa. Hence, the operation thereof is, in fact, an alternating one, as is shown in the remainder of the waveforms of FIG. 2(F), (G), (H), etc.

As a result of the movable arm around the resistance portion of potentiometer 37 by motor 51 and shaft 55, a half-wave, substantially sinusoidal voltage signal 165, similar to that shown in FIG. 2(I), is supplied to the control input of D.C. power amplifier 29. Of course, as previously mentioned, a predetermined suitable voltage is applied across said resistance 39 by D.C. power amplifier 29 (or other voltage source), thereby permitting arm 41 to pick-off the aforementioned varying voltage 165 therefrom. Obviously, potentiometer 37 is so designed that substantially no voltage gaps occur at the output of arm 41, as it circles around resistance 39. It, of course, would also be obvious for one skilled in the art having the benefit of the teachings presented herewith to construct potentiometer 37 to produce the signal waveform of FIG. 2(I) or, for that matter, any other voltage signal waveform desired, including square waves, oblong waves, modified half-wave sinusoidal waves, or the like.

The signal of FIG. 2(I) is, of course, a half-wave direct current voltage signal, and that is the signal that is amplified by D.C. power amplifier 29, so as to produce current signal 167—see FIG. 2(J)—at the output thereof.

Then, as a result of the timely switching operations of solenoid switches 97, every other half cycle of the signal of FIG. 2(J) is polarity inverted, so as to form current signal 169 having a substantially sinusoidal waveform, as represented in FIG. 2(K).

Signal 169 is obviously the signal which is supplied to load 101, which may be any utilization apparatus requiring such a signal to be supplied thereto in order to function properly.

At some subsequent times—see FIG. 2(B),(C), and (D)—171, 173, and 175, switches 87, 83, and 63 respectively open due to the rotations of driving motors 53 and 51 and the operation of the cams and cam followers associated therewith. The opening thereof at such respective times, of course, stop a predetermined period of operation of the invention; however, it may be restarted merely by the closing of push button switch 91, either manually or by some suitable programmed means.

The artisan will obviously be able to FIGURE out numerous uses for the portable pulsed signal generator of FIG. 1; however, one use therefor has been found and employed successfully and, accordingly, is herewith represented by the system of FIG. 3. Hence, as shown, portable pulsed signal generator 11 has its output—that is, the output that was previously shown as being connected to load 101 in FIG. 1—connected to the input of a utilization apparatus 171 such as a minesweeping device, electromagnetic transducing coil, or the like.

Assuming that the preferred embodiment of utilization apparatus 171 is a minesweeping device, it becomes energized by the signal of FIG. 2(K) and broadcasts an electromagnetic, acoustic, or other signal 173 towards mine 175, which is intended to be neutralized. Of course, the actual transducing means depends on the environmental medium within which mine 175 is located. For example, if mine 175 has been deployed in water, it would probably be responsive to acoustical energy. In such case, minesweeping device 171 would be an electroacoustical transducer which broadcasts acoustical energy in response to and substantially proportional to the signal of FIG. 2(K). On the other hand, if mine 175 were a land mine—either above or below the surface thereof—it may be responsive to electromagnetic energy, acoustical energy, or both, and thus the minesweeping device would be either some suitable coil, an electroacoustical transducer, or both.

Obviously, it would be well within the purview of the artisan having the benefit of the teachings presented herewith to select whatever utilization device would be proper in order to effect the destruction of mine 175 or any other device, regardless of its environmental disposition. Also, it would ostensively be obvious to the artisan to make whatever design choices as would be necessary to use D.C. power sources other than batteries. For instance, it would only be a minor matter of making the design choice of selecting a diesel engine driven welding generator as direct current power source 13, if so desired.

Obviously, other modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A portable pulsed signal generator, comprising in combination:
   a plurality of series connected batteries;
   an inverter, having a pair of inputs and a pair of outputs, with one of the inputs thereof connected to the negative terminal of one of the batteries of the aforesaid plurality of series connected batteries, and with other input thereof connected to the positive terminal of said one battery of the aforesaid plurality of series connected batteries;
   a first motor, having an input, an output, and a rotatable shaft, with the input thereof connected to one of the outputs of said inverter;
   an on-off switch, having a pair of terminals and means for effecting the timely electrical closure thereof, with one of the terminals thereof connected to the electrical output of said first motor, and with the other terminal thereof connected to the other output of said inverter;
   a first cam mounted on the shaft of said first motor for rotation therewith
   a first cam follower disposed in slidable engagement with said first cam for timely movement thereby;

a first switch having a fixed contact and a movable arm, with the fixed contact thereof electrically connected to said one terminal of the aforesaid on-off switch, and with the movable arm thereof mechanically connected to said first cam follower;

a second cam mounted on the shaft of said first motor for rotation therewith;

a second cam follower disposed in slidable engagement with said second cam for timely movement thereby;

a second switch having a fixed contact and a movable arm, with the fixed contact thereof electrically connected to the movable arm of said first switch and to the other terminal of the aforesaid on-off switch;

a second motor having an input, an output, and a rotatable shaft, with the input thereof connected to said one output of said inverter, and with the output thereof electrically connected to the movable arm of said second switch;

a third cam mounted on the shaft of said second motor for rotation therewith;

a third cam follower disposed in slidable engagement with said third cam for timely movement thereby.

a third switch having a movable arm and two fixed contacts, with the movable arm thereof mechanically connected to said third cam follower in such manner as to be alternately closed with the fixed contacts thereof in response thereto, and with the movable arm thereof electrically connected to the negative terminal of the aforesaid one of said plurality of series connected batteries;

a fourth cam mounted on the shaft of said second motor for rotation therewith;

a fourth cam follower disposed in slidable engagement with said fourth cam for timely movement thereby;

a fourth switch having a fixed contact and a movable arm, with the fixed contact thereof electrically connected to the output of said second motor, with the movable arm thereof electrically connected to said other output of the aforesaid inverter, and with the movable arm thereof mechanically connected to said fourth cam follower in such manner as to be opened and closed with the fixed contact thereof in response to timely movement of said fourth cam follower;

a direct current power amplifier having a predetermined direct current voltage supply, a positive potential input, a negative potential input with respect to said positive potential input, a control input, and a positive potential output, the potential of which is more positive than that of said negative potential input and less positive than that of said positive potential input, with the positive potential input thereof connected to the positive terminal of said one battery of the aforesaid plurality of series connected batteries, and with the negative potential input connected to the negative of another of the batteries of said plurality of series connected batteries;

a potentiometer having a fixed resistance and a movable arm in slidable engagement therewith, with the fixed resistance thereof connected across the aforesaid predetermined direct current voltage supply of said direct current power amplifier, with the movable arm thereof mechanically connected to the shaft of said second motor for rotation therewith, and with the movable arm thereof electrically connected to the aforesaid control input of said direct current power amplifier;

a pair of output terminals;

a first solenoid relay having first and second switches and a solenoid connected thereto for the simultaneous opening and closing thereof, with the first switch thereof connected between the positive potential output of said direct current power amplifier and one of said pair of output terminals, and with the second switch thereof connected between the positive terminal of said one battery of the aforesaid plurality of series connected batteries and the other of said pair of output terminals, and with the solenoid thereof connected between one of the fixed contacts of the aforesaid third switch and the negative input of said direct current power amplifier;

a second solenoid relay having third and fourth switches and a solenoid connected thereto for the simultaneously opening and closing thereof, with the third switch thereof connected between the positive potential output of said direct current power amplifier and said other of said pair of output terminals, and with the fourth switch connected between the positive terminal of said one of the aforesaid plurality of series connected batteries and said one of said pair of output terminals, and with the solenoid thereof connected between the other of the fixed contacts of said third switch and the negative input of said direct current power amplifier.

2. The invention of claim 1, further characterized by a ground connected to the negative terminal of another of the batteries of said plurality of series connected batteries.

3. The invention of claim 1, further characterized by a load connected to said pair of output terminals.

4. The invention of claim 1, further characterized by a programmer connected to said on-off switch in such manner as to effect the opening and closing thereof in acordance with a predetermined program.

5. A portable pulsed signal generator, comprising in combination;

source of direct current electrical power;

a direct current power amplifier connected to said direct current source and comprising a rotary control potentiometer for varying the output of said amplifier;

reversing relay means, connected between the output of said amplifier and a load when connected to said generator;

an inverter connected to said source so as to provide an alternating current output;

a first motor connected to said inverter and having a rotatable shaft;

an on-off switch connected in series between said inverter and said first motor for controlling energization thereof;

means cam mounted on the shaft of said first motor for rotation therewith;

a second motor, connected to said inverter and having a rotatable shaft connected to said rotary potentiometer;

cam means mounted on the shaft of said second motor for rotation therewith;

first cam operable switch means, responsive to rotation of said shaft of said first motor, for maintaining energization of said first motor for a predetermined period after energization thereof by said on-off switch;

second cam operable switch means, responsive to rotation of said shaft of said first motor, for energizing said second motor;

third cam operated switch means, responsive to rotation of said shaft of said second motor, for energizing said reversing relay means in timed relation to operation of said rotary potentiometer, whereby an alternating current of predetermined waveform is generated; and fourth cam operated switch means responsive to rotation of said shaft of said second motor, for maintaining energization thereof for a predetermined pulse period, whereby momentary actuation of said on-off switch will result in generation of said alternating current for said predetermined pulse period.

* * * * *